(12) United States Patent
Ono

(10) Patent No.: US 8,248,513 B2
(45) Date of Patent: Aug. 21, 2012

(54) IMAGE PROCESSING APPARATUS, IMAGE PROCESSING METHOD, IMAGE CAPTURING APPARATUS, IMAGE CAPTURING METHOD, AND COMPUTER READABLE MEDIUM

(75) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 375 days.

(21) Appl. No.: 12/569,654

(22) Filed: Sep. 29, 2009

(65) Prior Publication Data

US 2010/0079627 A1 Apr. 1, 2010

(30) Foreign Application Priority Data

Sep. 30, 2008 (JP) ................................. 2008-255044

(51) Int. Cl.
*H04N 5/225* (2006.01)
(52) U.S. Cl. ........................................ 348/340; 348/241
(58) Field of Classification Search .................... 348/65, 348/207.99, 222.1, 241, 335, 340; 382/128, 382/255; 359/558, 676
See application file for complete search history.

(56) References Cited

U.S. PATENT DOCUMENTS

| | | | | | |
|---|---|---|---|---|---|
| 5,748,371 A | * | 5/1998 | Cathey et al. | ................. | 359/558 |
| 2003/0122926 A1 | * | 7/2003 | Kumei et al. | ................. | 348/65 |
| 2004/0190762 A1 | * | 9/2004 | Dowski et al. | ................. | 382/128 |
| 2007/0247725 A1 | * | 10/2007 | Dowski et al. | ................. | 359/676 |
| 2008/0012955 A1 | * | 1/2008 | Johnson et al. | ............. | 348/222.1 |
| 2008/0131018 A1 | * | 6/2008 | Findlay et al. | ................. | 382/255 |
| 2009/0096882 A9 | * | 4/2009 | Johnson et al. | ............. | 348/222.1 |
| 2010/0246989 A1 | * | 9/2010 | Agrawal et al. | ................. | 382/255 |

FOREIGN PATENT DOCUMENTS

| | | |
|---|---|---|
| JP | 11-500235 A | 1/1999 |
| JP | 2006-94469 A | 4/2006 |

* cited by examiner

*Primary Examiner* — Nelson D. Hernández Hernández
*Assistant Examiner* — Dennis Hogue
(74) *Attorney, Agent, or Firm* — Birch, Stewart, Kolasch & Birch, LLP

(57) ABSTRACT

Provided is an image processing apparatus comprising an image acquiring section that acquires an image captured through an optical system having an optical transfer function that depends at least on distance to an object point, the optical system holding spread of light from the object point substantially constant regardless of the distance to the object point; an image processing section that applies a correction process for correcting the spread of light to the image, based on the optical transfer function of the optical system; and an image generating section that generates a composite image by superimposing, onto each other, a plurality of corrected images generated by the image processing section applying, to the image, different correction processes corresponding to different optical transfer functions.

9 Claims, 6 Drawing Sheets

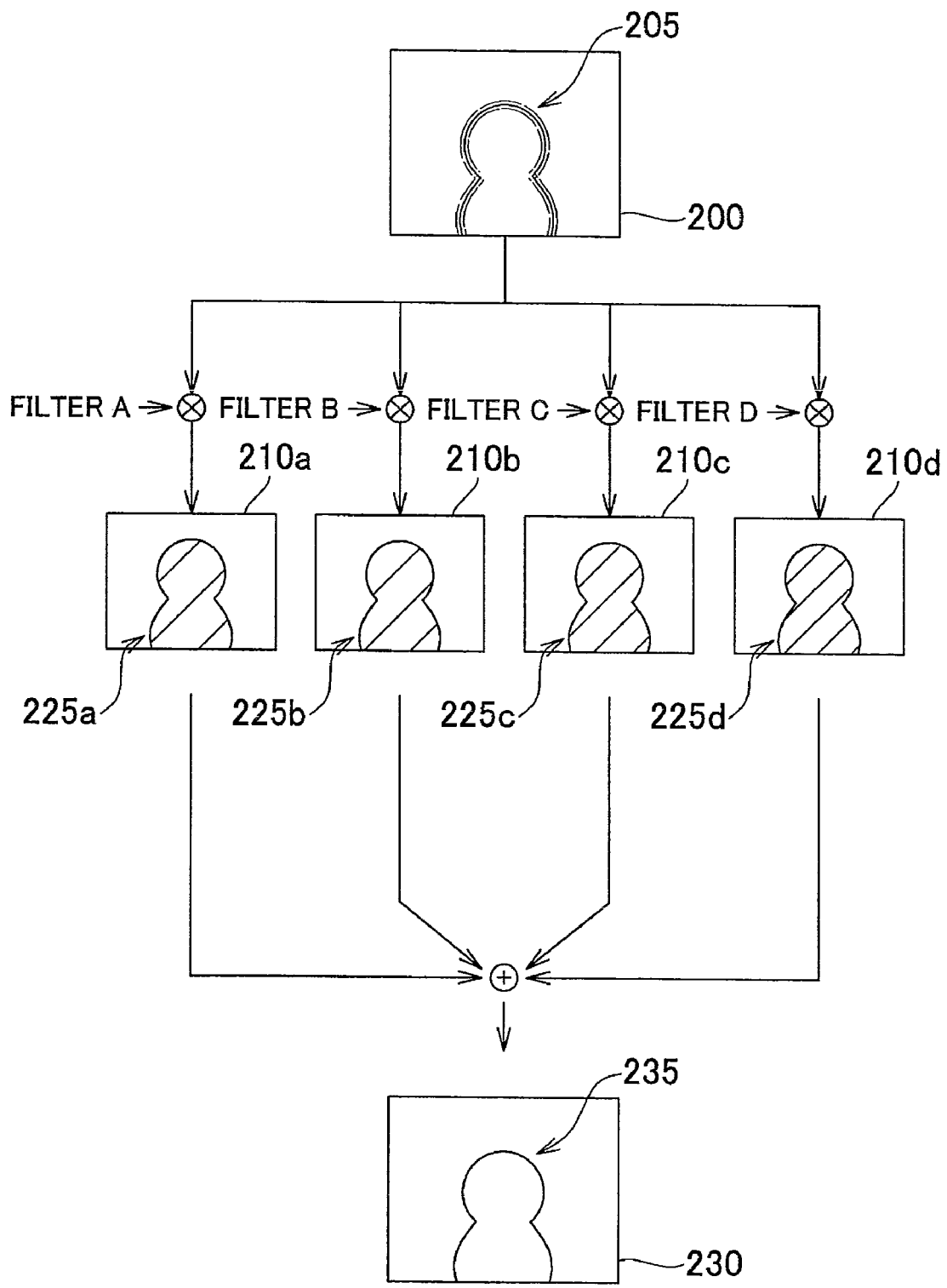
F I G . 3

188

| DIAPHRAGM VALUE | LENS POSITION | IMAGE REGION | FILTER |
|---|---|---|---|
| $F_1$ | $z_1$ | REGION 1 | FILTER $A_1 \sim D_1$ |
| $F_1$ | $z_1$ | REGION 2 | FILTER $A_2 \sim D_2$ |
| ⋮ | ⋮ | ⋮ | ⋮ |

F I G . 4

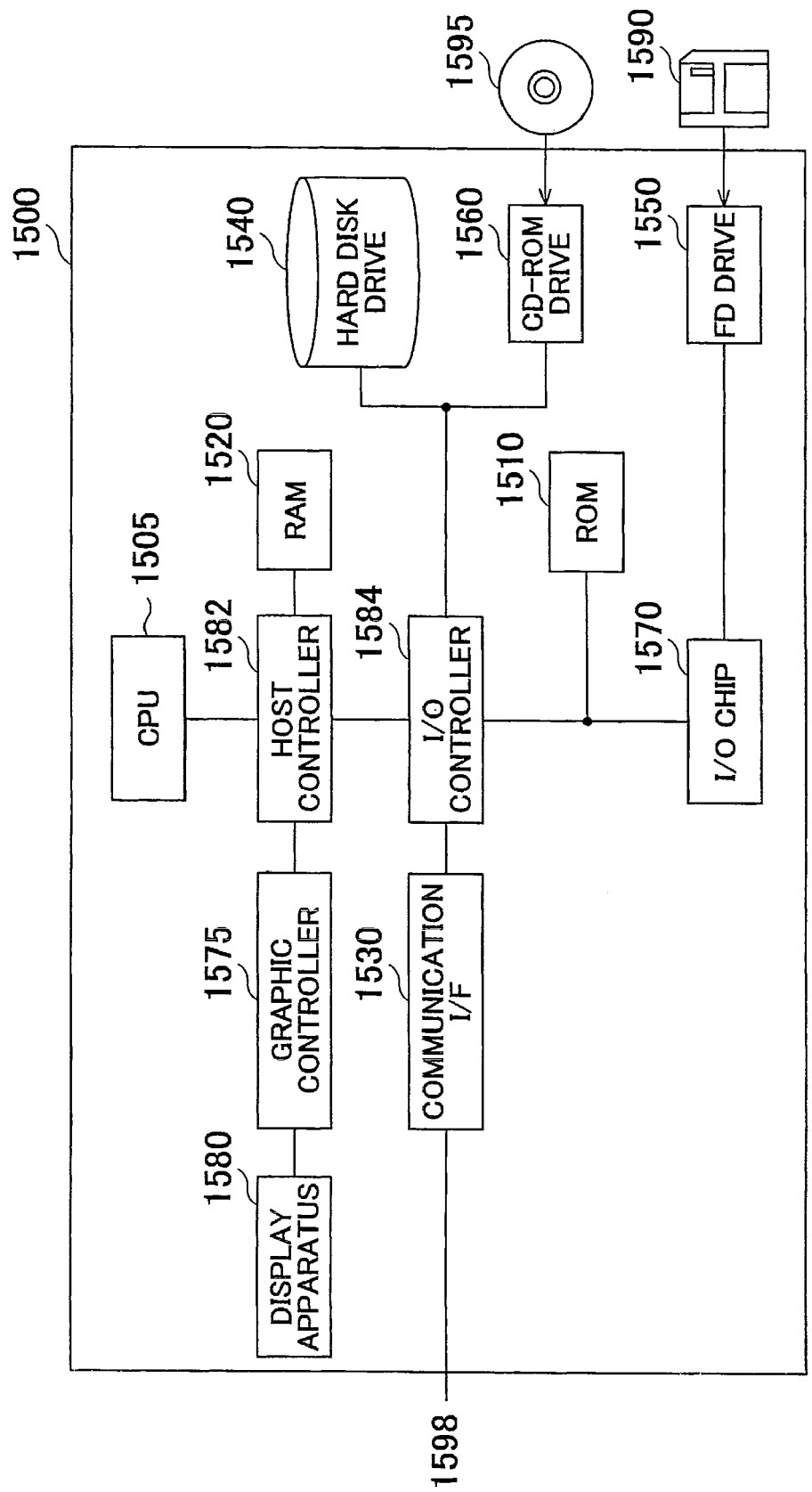
F I G. 6

IMAGE PROCESSING APPARATUS, IMAGE PROCESSING METHOD, IMAGE CAPTURING APPARATUS, IMAGE CAPTURING METHOD, AND COMPUTER READABLE MEDIUM

CROSS REFERENCE TO RELATED APPLICATION

The present application claims priority from Japanese Patent Application No. 2008-255044 filed on Sep. 30, 2008, the contents of which are incorporated herein by reference.

BACKGROUND

1. Technical Field

The present invention relates to an image processing apparatus, an image processing method, an image capturing apparatus, an image capturing method, and a computer readable medium.

2. Related Art

A technique for using a phase plate having a 3-dimensional curved surface to hold an optical transfer function of an optical system substantially constant within a range set by a focal position is known, as in, for example, Japanese Patent Application Publication No. 2006-94469 and Japanese Unexamined Patent Application Publication No. 11-500235.

With this technique, however, it is necessary to provide a separate distance measuring device to measure the subject distance with an external active device. Even when the subject distance is unknown, appropriate restoration of the subject image is desired.

SUMMARY

Therefore, it is an object of an aspect of the innovations herein to provide an image processing apparatus, an image processing method, an image capturing apparatus, an image capturing method, and a computer readable medium, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary image processing apparatus may comprise an image acquiring section that acquires an image captured through an optical system having an optical transfer function that depends at least on distance to an object point, the optical system holding spread of light from the object point substantially constant regardless of the distance to the object point; an image processing section that applies a correction process for correcting the spread of light to the image, based on the optical transfer function of the optical system; and an image generating section that generates a composite image by superimposing, onto each other, a plurality of corrected images generated by the image processing section applying, to the image, different correction processes corresponding to different optical transfer functions.

According to a second aspect related to the innovations herein, one exemplary image processing method may comprise acquiring an image captured through an optical system having an optical transfer function that depends at least on distance to an object point, the optical system holding spread of light from the object point substantially constant regardless of the distance to the object point; applying a correction process for correcting the spread of light to the image, based on the optical transfer function of the optical system; and generating a composite image by superimposing, onto each other, a plurality of corrected images generated by applying, to the image, different correction processes corresponding to different optical transfer functions.

According to a third aspect related to the innovations herein, one exemplary computer readable medium may include a computer readable medium storing thereon a program for use by an image processing apparatus, the program causing a computer to function as an image acquiring section that acquires an image captured through an optical system having an optical transfer function that depends at least on distance to an object point, the optical system holding spread of light from the object point substantially constant regardless of the distance to the object point; an image processing section that applies a correction process for correcting the spread of light to the image, based on a specified optical transfer function of the optical system; and an image generating section that generates a composite image by superimposing, onto each other, a plurality of corrected images generated by the image processing section applying, to the image, different correction processes corresponding to different optical transfer functions.

According to a fourth aspect related to the innovations herein, one exemplary image capturing apparatus may comprise an optical system that holds spread of light from an object point substantially constant regardless of distance to the object point and has an optical transfer function that depends at least on distance to a subject; an image capturing section that captures an image of the subject through the optical system; a control section that controls the optical transfer function of the optical system by controlling an imaging characteristic of the optical system, while causing the image capturing section to capture a plurality of images; an image processing section that applies, to the plurality of images, a correction process for correcting the spread of light, based on a specified optical transfer function of the optical system; and an image generating section that generates a composite image by superimposing, onto each other, a plurality of corrected images generated by the image processing section applying the correction process to each of the plurality of images.

According to a fifth aspect related to the innovations herein, one exemplary image capturing method may comprise capturing, with an image capturing section, an image of a subject through an optical system that holds spread of light from an object point substantially constant regardless of distance to the object point and that has an optical transfer function that depends at least on distance to the object point; controlling an imaging characteristic of the optical system to control the optical transfer function of the optical system, and causing the image capturing section to capture a plurality of images; applying, to the plurality of images, a correction process for correcting the spread of light, based on a specified optical transfer function of the optical system; and generating a composite image by superimposing, onto each other, a plurality of corrected images generated by applying the correction process to each of the plurality of images.

According to a sixth aspect related to the innovations herein, one exemplary computer readable medium may include a computer readable medium storing thereon a program for use by an image capturing apparatus, the program causing a computer to function as an image capturing section that captures an image of a subject through an optical system that holds spread of light from an object point substantially constant regardless of distance to the object point and that has an optical transfer function that depends at least on the distance to the object point; a control section that controls an imaging characteristic of the optical system to control the optical transfer function of the optical system, and causes the image capturing section to capture a plurality of images; an image processing section that applies, to the plurality of images, a correction process for correcting the spread of light, based on a specified optical transfer function of the optical system; and an image generating section that generates a composite image by superimposing, onto each other, a plurality of corrected images generated by the image processing section applying the correction process to each of the plurality of images.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 3 shows an exemplary image processing flow for canceling out the artifact components.

FIG. 4 shows exemplary data stored by the image processing parameter storing section 188.

FIG. 6 shows an exemplary hardware configuration of a hardware configuration of a computer 1500 functioning as the image capturing apparatus 110.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
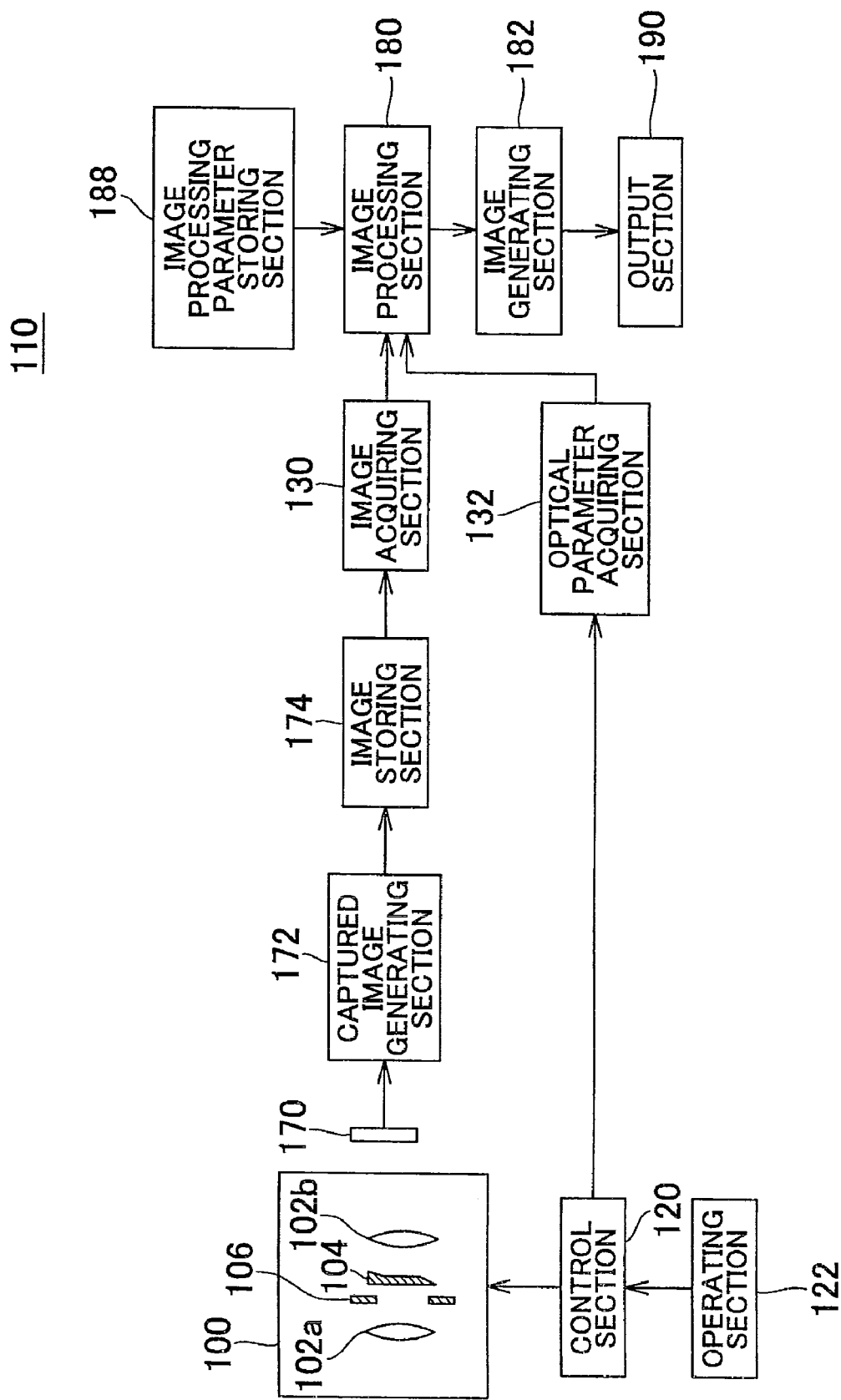
FIG. 1 shows an exemplary configuration of an image capturing apparatus 110 according to an embodiment of the present invention.

FIG. 1 shows an exemplary configuration of an image capturing apparatus 110 according to an embodiment of the present invention. The image capturing apparatus 110 can decrease the intensity of artifacts in a subject image caused by the subject distance. The image capturing apparatus 110 may be a digital still camera, a cellular phone with an image capturing function, a surveillance camera, an endoscope, or any of a variety of other types of image capturing devices.

The image capturing apparatus 110 is provided with an optical system 100, a light receiving section 170, a captured image generating section 172, an image storing section 174, an image acquiring section 130, an image processing section 180, an image processing parameter storing section 188, an image generating section 182, an output section 190, an optical parameter acquiring section 132, a control section 120, and an operating section 122. The optical system 100 includes a plurality of imaging lenses 102a and 102b, a light modulating section 104, and a diaphragm section 106. Hereinafter, the imaging lenses 102a and b are referred to collectively as the "imaging lenses 102."

The diaphragm section 106 restricts light passing through the optical system 100. In the example of FIG. 1, the diaphragm section 106 is provided between the imaging lenses 102 and the light modulating section 104. In other configurations, the diaphragm section 106 may be provided between the subject and at least one of the imaging lenses 102 and the light modulating section 104, or may be provided between the light receiving section 170 and at least one of the imaging lenses 102 and the light modulating section 104.

The optical system 100 holds the spread of light from an object point relatively constant over varying distances to the object point by causing the light modulating section 104 to perform wavefront modulation on the light. For example, the optical system 100 may hold the spread of light from the object point relatively constant on the light receiving surface of the light receiving section 170, with respect to distance to the object point, by using the modulation of the wavefront of the light caused by the light modulating section 104.

The light modulating section 104 may be a phase plate having a three-dimensional curved surface. For example, the light modulating section 104 may have a curved surface expressed by a third-order expression where each value is a coordinate in a coordinate system having the optical axis as the point of origin. More specifically, the light modulating section 104 may have a curved surface expressed by a third-order expression where each value is a coordinate in a coordinate system associated with an orthogonal coordinate system having the optical axis as the point of origin. For example, if the two axes orthogonal to the optical axis of the optical system 100 are x and y and $\alpha$ is a constant, the wavefront aberration caused by the light modulating section 104 is expressed as $\alpha(x^3+y^3)$. Such a light modulating section 104 applies, to the light from the object point, a three-dimensional phase distribution relating to a coordinate system having the optical axis as a point of origin. In this way, the light passed through the optical system 100 forms an image with the same blur at the light receiving section 170, regardless of the position of the object point.

The optical transfer function of the optical system 100 depends on the defocus amount. More specifically, the optical transfer function of the optical system 100 depends on the position of the object point along the optical axis of the optical system 100. The optical transfer function of the optical system 100 also depends on imaging characteristics of the optical system 100. An imaging characteristic of the optical system 100 may be exemplified by the position of the optical system 100 or by the degree to which the diaphragm section 106 is opened. The focal distance of the optical system 100 can also be included as an imaging characteristic of the optical system 100.

The light receiving section 170 receives light from the subject that passes through the optical system 100. The light receiving section 170 includes a plurality of image capturing elements that are arranged 2-dimensionally on a surface that is perpendicular to the optical axis of the optical system 100. The image capturing elements of the light receiving section 170 may be CCD image capturing elements or may be CMOS image capturing elements. An image capture signal that indicates the amount of light received by each image capturing element is supplied to the captured image generating section 172.

The captured image generating section 172 generates images based on captured image signals. The captured image generating section 172 generates a digital image by performing an AD conversion on the captured image signal from each image capturing element. The light receiving section 170 and the captured image generating section 172 function as the image capturing section that captures an image of the subject through the optical system 100.

The image storing section 174 stores the images generated by the captured image generating section 172. The image storing section 174 may include a storage element such as a semiconductor memory or a magnetic memory. The image storing section 174 may include volatile storage elements or non-volatile storage elements.

The image acquiring section 130 acquires the images stored in the image storing section 174. In this way, the image acquiring section 130 acquires an image captured through the optical system 100. In the following explanation, the item referred to simply as "the image" is the image captured by the image acquiring section 130.

The image processing section 180 applies a correction process for correcting the light spread, based on the optical transfer function of the optical system 100 corresponding to a specified optical transfer function. More specifically, the image processing section 180 applies the correction process for correcting a light spread corresponding to a specified defocus amount, based on the optical transfer function of the optical system 100 corresponding to the specified defocus amount. Yet more specifically, the image processing section 180 generates a plurality of corrected images by applying different correction processes each corresponding to a different focus amount to the image. The defocus amount may be determined according to the position of the object point and the position of the optical system 100, for example. Accordingly, the image processing section 180 may apply, to the image, a plurality of different correction processes each corresponding to a combination of the position of the object point and the position of the optical system 100.

More specifically, the image processing section 180 may generate the plurality of corrected images by applying, to the image, different correction processes each corresponding to a different position of the object point. The image processing section 180 may instead generate the plurality of corrected images by applying, to the image, different correction processes each corresponding to a combination of the position of the object point and the imaging characteristic. More specifically, the image processing section 180 may generate the plurality of corrected images by applying, to the image, different correction processes each corresponding to a combination of the position of the object point and the position of the optical system 100. As yet another example, the image processing section 180 may generate the plurality of corrected images by applying, to the image, different correction processes corresponding to a combination of the position of the object point, the position of the optical system 100, and the degree to which the diaphragm section 106 is opened.

The control section 120 controls the position of the optical system 100 and the opening of the diaphragm section 106. For example, the control section 120 may control the position of the optical system 100 and the opening of the diaphragm section 106 by controlling the position of the imaging lens 102 and a restriction value of the diaphragm section 106. The control section 120 may control the position of the optical system 100 and the diaphragm opening according to a command input via the operating section 122 by a user of the image capturing apparatus 110. As another example, the control section 120 may control the position of the optical system 100 and the diaphragm opening based on information indicating the distance to the subject. The "position of the optical system 100" may refer to a position of the principal point of an imaging lens system formed by the imaging lenses 102.

The information indicating the distance to the subject may be information such as a macro exposure designation from a user.

The image generating section 182 generates a composite image by superimposing, onto each other, the plurality of corrected images. More specifically, the image generating section 182 generates the composite image by superimposing onto each other the plurality of corrected images obtained by the correction processes corresponding to different optical transfer functions. By applying a different correction process corresponding to a different defocus amount to each image, each corrected image includes an image component of the subject image and an artifact component corresponding to the correction process. The image capturing apparatus 110 can substantially cancel out the artifact components by superimposing the plurality of corrected images onto each other, thereby achieving a composite image in which the image component of the subject image remains. In this way, the image generating section 182 can generate a composite image in which the reproduction errors such as artifacts are reduced. The image capturing apparatus 110 of the present embodiment can therefore obtain a clear subject image even if the distance to the subject is unknown.

The optical parameter acquiring section 132 acquires information indicating the imaging characteristic of the optical system 100 at a time when the image is captured. More specifically, the optical parameter acquiring section 132 acquires the position of the optical system 100 and the opening of the diaphragm when the image is captured. For example, the optical parameter acquiring section 132 may acquire, from the control section 120, the control values for the position of the optical system 100 and the opening of the diaphragm.

The image processing parameter storing section 188 stores information indicating the plurality of correction processes to be applied to the image, in association with imaging characteristics of the optical system 100. The image processing section 180 may generate the plurality of corrected images by applying, to the image, each of the plurality of correction process indicated by the information stored by the image processing parameter storing section 188 in association with an imaging characteristic substantially matching the imaging characteristic indicated by the information acquired by the optical parameter acquiring section 132. Therefore, the image processing section 180 can select a predetermined number of correction processes that can cancel out the artifact component, according to the imaging characteristic at the timing of image capturing. As a result, the image capturing apparatus 110 can greatly decrease the amount of computation necessary to generate the composite image 330.

The image acquiring section 130, the image processing section 180, the image generating section 182, the image processing parameter storing section 188, the output section 190 and the optical parameter acquiring section 132 may be provided to an image processing apparatus separate from the image capturing apparatus 110. This image processing apparatus can perform the correction processes described above by acquiring the image from the image capturing apparatus 110. This image processing apparatus may be exemplified as an electronic information processing apparatus such as a personal computer.

Figure 2:
FIG. 2 shows examples of artifacts included in corrected images.
Figure 2:

FIG. 2 shows examples of artifacts included in corrected images. The corrected image 260*a* is an example of a corrected image obtained by applying (i) a correction process using an inverse filter of the optical transfer function relative to light from an object point at a first distance to (ii) an image captured through the optical system 100 that includes the light modulating section 104 having the three-dimensional curved surface described above. The corrected image 260b is an example of a corrected image obtained by applying (i) a correction process using an inverse filter of the optical transfer function relative to light from an object point at a second distance to (ii) the image captured through the optical system 100 that includes the light modulating section 104 having the three-dimensional curved surface described above. The optical transfer function of the optical system 100 depends on the distance from the optical system 100 to the object point, and therefore restoration artifacts, such as those shown in FIG. 2, appear in the corrected images when the correction process is applied using an inverse filter of the optical transfer function corresponding to the an object point at a specified distance.

As shown in FIG. 2, the corrected images 260a and 260b include artifact components appearing as diagonal stripes. The intervals between stripes in the corrected image 260a are narrower than the intervals between stripes in the corrected image 260b, and the phase of the stripes is also different. These differences are caused by differences in the distance from the optical system 100 to the subject and the distance corresponding to the inverse filter that was used. On the other hand, since the shape of the artifacts are similar, the artifact components can cancel each other out by superimposing the plurality of corrected images obtained by applying, to the same image, a plurality of inverse filters corresponding to different distances.

FIG. 3 shows an exemplary image processing flow for canceling out the artifact components. In FIG. 3, the image 200 represents the captured image. The image 200 includes a blurred subject image 205. The image processing section 180 generates corrected images 210a to 210d by processing the image 200 with filters A to D. The filters A to D may be the inverse filters described above, deconvolution filters that restore an image blurred by the optical system 100 to a point image, or the like. Here, the filters A to D can restore a blurred image captured with different defocus amounts to a point image.

The subject images 225a to 225d included in the corrected images 210a to 210d include subject image components and artifact components, which are represented by the diagonal lines in FIG. 3. The artifact components depend on the defocus amounts corresponding to the filters D to A and the defocus amount caused by the position of the subject. As shown by the subject images 225a to 225d, as a result of applying the filters A to D corresponding to different defocus amounts to the image 200, striped artifact components at different intervals corresponding to the differences in defocus amount are superimposed on the subject image components in the corrected images. For example, the stripe pattern appears in the subject images 225a to 225d at different intervals and phases according to the difference between the defocus amounts.

The image generating section 182 generates the composite image 230 by adding together the corrected images 210a to 210d pixel by pixel. The superimposition process performed by the image generating section 182 cancels out the artifact components in the corrected images 210a to 210d, and preserves a clear subject image 235 in the composite image 230, since the subject image components are added together.

Figure 5:
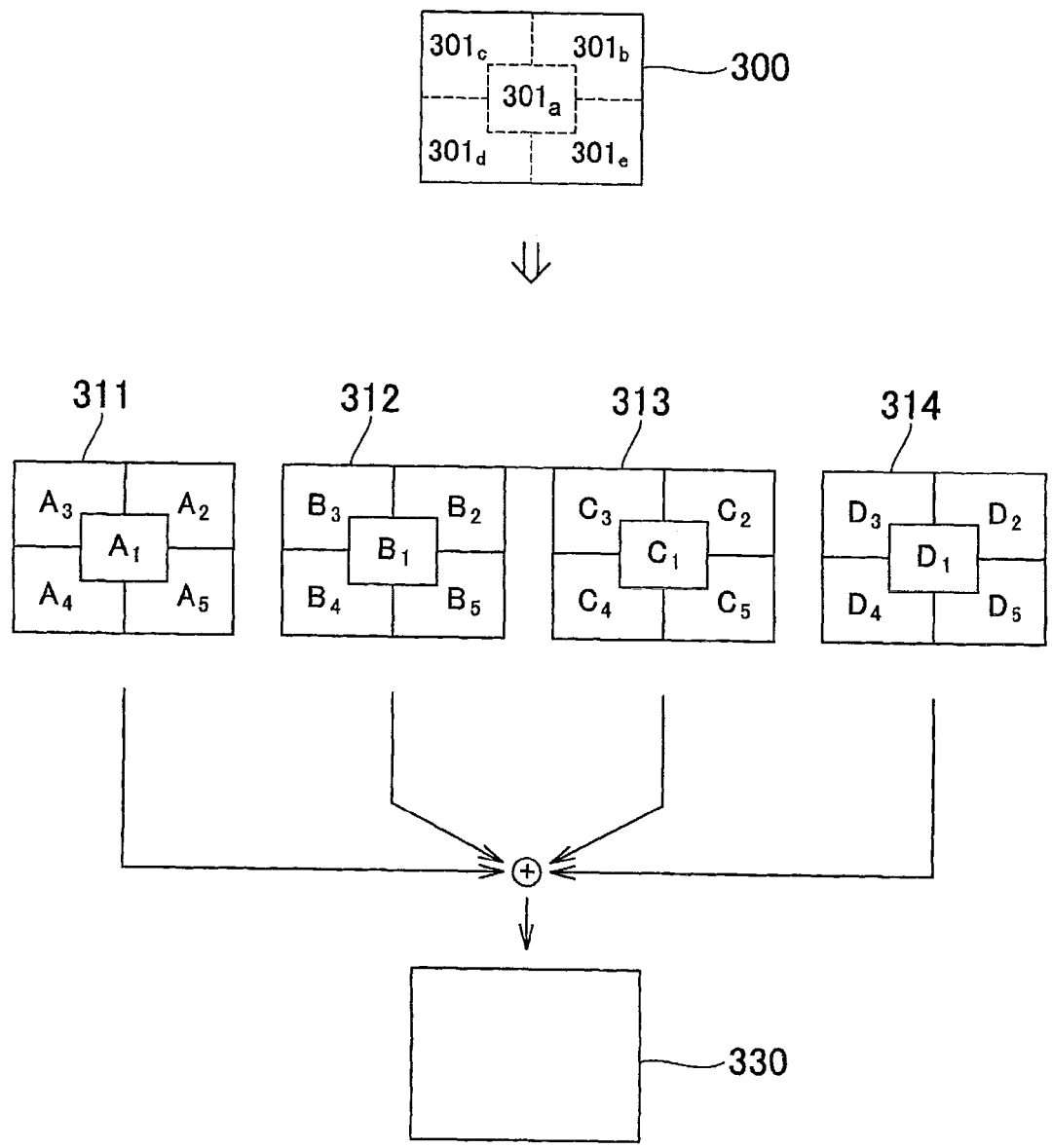
FIG. 5 shows an exemplary process flow of the image capturing apparatus 110 when applying different filters to each image region.

As described above, the image capturing apparatus 110 can reduce the intensity of artifact components in a subject image for subjects in a distance range that is wider than the range achievable by using inverse filters corresponding to a specific distance or defocus amount. Furthermore, even if the distance to the subject is unknown, the image capturing apparatus 110 can obtain a subject image in which the intensity of the artifact components is reduced. It should be noted that the optical transfer function of the optical system 100 changes according to the image height. Therefore, if the same inverse filter is applied to the entire image, the artifact components might not be effectively canceled out, depending on the image region. FIGS. 4 and 5 are referenced to describe a technique for selecting a combination of inverse filters that can effectively cancel out the artifact components for each image region.

FIG. 4 shows exemplary data stored by the image processing parameter storing section 188. The image processing parameter storing section 188 stores information specifying a filter to be used for each of the plurality of image regions, in association with (i) the lens position and the diaphragm opening of the optical system 100 at the time of image capturing and (ii) information identifying the plurality of image regions. The lens position may be the position of the optical system 100, as described above. The image processing parameter storing section 188 can store vector information or the like indicating the shape of the image regions as the information identifying the image regions. If the image regions are rectangular, the information identifying the image regions may be coordinate values for the corners of each rectangle.

For example, the image processing parameter storing section 188 may store the filters $A_1$ to $D_1$ as the filters to be applied to an image region that is displayed in area 1 of an image captured with a diaphragm value of $F_1$ and a lens position of $z_1$. The image processing parameter storing section 188 may store the filters $A_2$ to $D_2$ as the filters to be applied to an image region that is displayed in area 2 of the above image. In this way, the image processing section 180 can select, for each image region and each imaging characteristic of the optical system 100, a plurality of filters that can cancel out the artifact components.

FIG. 5 shows an exemplary process flow of the image capturing apparatus 110 when applying different filters to each image region. The image processing parameter storing section 188 stores filters $A_1$ to $D_1$ as the filters to be applied to the image region $301_a$ in the image 300, stores filters $A_2$ to $D_2$ as the filters to be applied to the image region $301_b$, stores filters $A_3$ to $D_3$ as the filters to be applied to the image region $301_c$, stores filters $A_4$ to $D_4$ as the filters to be applied to the image region $301_d$, and stores filters $A_5$ to $D_5$ as the filters to be applied to the image region $301_e$.

The image processing section 180 generates corrected images 311 to 314 by applying each group of filters $A_1$ to $D_1$, $A_2$ to $D_2$, $A_3$ to $D_3$, $A_4$ to $D_4$, and $A_5$ to $D_5$ respectively to the image regions 301a to 301e. In FIG. 5, the letters and numerals recorded in each of the image regions 301a to 301e in the corrected images 311 to 314 identify the applied filter. In this way, the image processing section 180 can generate the plurality of corrected images by using each image processing parameter stored by the image processing parameter storing section 188 in association with an image region to correct the corresponding image region.

The image generating section 182 generates the composite image 330 by adding together the pixel values of corresponding pixels in the corrected images 311 to 314. The optical transfer function of the optical system 100 changes according to the image height and the imaging state of the optical system 100. The image processing parameter storing section 188 stores a predetermined combination of filters that can cancel out the artifact components, in association with a state of the optical system 100 and an image region. Therefore, the image processing section 180 can greatly reduce the amount of computation necessary for generating the composite image 330 by applying a plurality of predetermined filters according to the image region and the state of the optical system 100.

As described in relation to FIGS. 1 to 5, the image capturing apparatus 110 can generate a composite image in which the artifact components caused by differences in the defocus amount are cancelled out, by applying a plurality of correction processes corresponding to different defocus amounts to an image captured with a specified defocus amount and then superimposing the corrected images onto each other. Furthermore, the artifact components caused by differences in the defocus amount can also be cancelled out by applying a correction process corresponding to a specified defocus amount to images captured with different focus amounts and then superimposing the corrected images onto each other.

More specifically, the control section 120 may control the defocus amount by controlling the imaging characteristic of the optical system 100 to capture a plurality of images at different defocus amounts. The image processing section 180 may then apply, to the plurality of images, the correction process for correcting the light spread according to a specified defocus amount, based on the optical transfer function of the optical system 100 according to the specified defocus amount. The image generating section 182 may generate the composite image by superimposing, upon each other, the plurality of corrected images generated by the image processing section 180 applying the correction process to the plurality of images.

More specifically, the control section 120 may control the defocus amount by controlling the position of the optical system 100 to capture a plurality of images. The image processing section 180 may then generate the plurality of corrected images by applying, to the plurality of images, the correction process for correcting the light spread according to a specified object point position, based on the optical transfer function of the optical system 100 according to the specified object point position. The image processing section 180 may instead generate the plurality of corrected images by applying, to the plurality of images, the correction process for correcting the light spread according to a specified object point position and optical system 100 position, based on the optical transfer function of the optical system 100 according to the specified object point position and optical system 100 position. As yet another example, the image processing section 180 may generate the plurality of corrected images by applying, to the plurality of images, the correction process for correcting the light spread according to a specified object point position, optical system 100 position, and diaphragm opening, based on the optical transfer function of the optical system 100 according to the specified object point position, optical system 100 position, and diaphragm opening. Instead of the position of the optical system 100, the focal distance may be used as a parameter for controlling the defocus amount. As another example, a combination of the position of the optical system 100 and the focal distance may be added as a parameter for controlling the defocus amount.

The above description used a phase plate having a three-dimensional curve as an example of the light modulating section 104, but the light modulating section 104 can change the wavefront using various other means. For example, the light modulating section 104 may be an optical element with a non-three-dimensional curve, an optical element with changeable refraction, such as a refraction distribution wavefront modulating optical element, an optical element with a thickness and refraction that changes according to a coating applied to the lens surface, such as a wavefront modulation hybrid lens, or a liquid crystal element that can modulate the phase distribution of the light, such as a liquid crystal space phase modulating element.

The image of the present embodiment may be a constituent image used as part of a moving image. This moving image constituent image can be exemplified as a frame image. The image capturing apparatus 110 can generate the composite image having reduced artifacts by applying the image processing described above to each of the plurality of constituent images in the moving image.

FIG. 6 shows an exemplary hardware configuration of a hardware configuration of a computer 1500 functioning as the image capturing apparatus 110. An electronic information processing apparatus, such as the computer 1500 described in relation to FIG. 7, can function as the image capturing apparatus 110.

The computer 1500 is provided with a CPU peripheral section that includes a CPU 1505, a RAM 1520, a graphic controller 1575, and a display apparatus 1580 connected to each other by a host controller 1582; an input/output section that includes a communication interface 1530, a hard disk drive 1540, and a CD-ROM drive 1560, all of which are connected to the host controller 1582 by an input/output controller 1584; and a legacy input/output section that includes a ROM 1510, a flexible disk drive 1550, and an input/output chip 1570, all of which are connected to the input/output controller 1584.

The host controller 1582 is connected to the RAM 1520 and is also connected to the CPU 1505 and graphic controller 1575 accessing the RAM 1520 at a high transfer rate. The CPU 1505 operates to control each section based on programs stored in the ROM 1510 and the RAM 1520. The graphic controller 1575 acquires image data generated by the CPU 1505 or the like on a frame buffer disposed inside the RAM 1520 and displays the image data in the display apparatus 1580. In addition, the graphic controller 1575 may internally include the frame buffer storing the image data generated by the CPU 1505 or the like.

The input/output controller 1584 connects the hard disk drive 1540, the communication interface 1530 serving as a relatively high speed input/output apparatus, and the CD-ROM drive 1560 to the host controller 1582. The hard disk drive 1540 stores the programs and data used by the CPU 1505. The communication interface 1530 is connected to a network communication apparatus 1598 and receives the programs or the data. The CD-ROM drive 1560 reads the programs and data from a CD-ROM 1595 and provides the read information to the hard disk drive 1540 and the communication interface 1530 via the RAM 1520.

Furthermore, the input/output controller 1584 is connected to the ROM 1510, and is also connected to the flexible disk drive 1550 and the input/output chip 1570 serving as a relatively high speed input/output apparatus. The ROM 1510 stores a boot program performed when the computer 1500 starts up, a program relying on the hardware of the computer 1500, and the like. The flexible disk drive 1550 reads programs or data from a flexible disk 1590 and supplies the read information to the hard disk drive 1540 and the communication interface 1530 via the RAM 1520. The input/output chip 1570 connects the flexible disk drive 1550 to each of the input/output apparatuses via, for example, a parallel port, a serial port, a keyboard port, a mouse port, or the like.

The programs performed by the CPU 1505 are stored on a recording medium such as the flexible disk 1590, the CD-ROM 1595, or an IC card and are provided by the user. The programs stored on the recording medium may be compressed or uncompressed. The programs are installed on the hard disk drive 1540 from the recording medium, are read by the RAM 1520, and are performed by the CPU 1505. The programs performed by the CPU 1505 cause the computer 1500 to function as the captured image generating section 172, the image storing section 174, the image acquiring section 130, the image processing section 180, the image processing parameter storing section 188, the image generating section 182, the output section 190, the optical parameter acquiring section 132, and the control section 120 described in relation to FIGS. 1 to 6.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to the Internet or a specialized communication network may be used as the storage medium and the programs may be provided to the computer 1500 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. An image processing apparatus comprising:
   an image acquiring section that acquires an image captured through an optical system having an optical transfer function that depends at least on distance to an object point, the optical system holding spread of light from the object point substantially constant regardless of the distance to the object point;
   an image processing section that applies a correction process for correcting the spread of light to the image, based on the optical transfer function of the optical system;
   an image generating section that generates a composite image by superimposing, onto each other, a plurality of corrected images generated by the image processing section applying, to the image, different correction processes corresponding to different optical transfer functions,
   an optical parameter acquiring section that acquires information indicating the imaging characteristic of the optical system at the time when the image is captured; and
   an image processing parameter storing section that stores information indicating a plurality of correction processes to be applied to the image, in association with imaging characteristics of the optical system, wherein
      the optical transfer function of the optical system further depends on an object point position along an optical axis of the optical system,
      the image processing section generates the plurality of corrected images by applying, to the image, different correction processes corresponding to different object point positions,
      the image processing section generates the plurality of corrected images by applying, to the image, a plurality of correction processes indicated by information stored by the image processing parameter storing section in association with an imaging characteristic substantially matching the imaging characteristic indicated by the information acquired by the optical parameter acquiring section,
      the optical transfer function of the optical system further depends on the object point position and an imaging characteristic of the optical system, and
      the image processing section generates the plurality of corrected images by applying, to the image, different correction processes corresponding to different object point positions and imaging characteristics.

2. An image capturing apparatus comprising:
   an optical system that holds spread of light from an object point substantially constant regardless of distance to the object point and has an optical transfer function that depends at least on distance to a subject;
   an image capturing section that captures an image of the subject through the optical system;
   a control section that controls the optical transfer function of the optical system by controlling an imaging characteristic of the optical system, while causing the image capturing section to capture a plurality of images;
   an image processing section that applies, to the plurality of images, a correction process for correcting the spread of light, based on a specified optical transfer function of the optical system; and
   an image generating section that generates a composite image by superimposing, onto each other, a plurality of corrected images generated by the image processing section applying the correction process to each of the plurality of images.

3. The image capturing apparatus according to claim 2, wherein
   the optical transfer function of the optical system depends on a position of the optical system,
   the control section controls the optical transfer function by controlling the position of the optical system, while causing the image capturing section to capture a plurality of images, and
   the image processing section generates the plurality of corrected images by applying, to the plurality of images, a correction process for correcting the spread of light corresponding to a specified position of the optical system, based on the optical transfer function of the optical system corresponding to the specified position of the optical system.

4. The image capturing apparatus according to claim 3, wherein
   the optical transfer function of the optical system depends on an object point position along an optical axis of the optical system and the position of the optical system, and
   the image processing section generates the plurality of corrected images by applying, to the plurality of images, a correction process for correcting the spread of light corresponding to a specified object point position and position of the optical system, based on the optical transfer function of the optical system corresponding to the specified object point position and position of the optical system.

5. The image capturing apparatus according to claim 4, wherein
   the optical system includes a diaphragm section,
   the optical transfer function of the optical system depends on the object point position, the position of the optical system, and a diaphragm opening of the diaphragm section, and
   the image processing section generates the plurality of corrected images by applying, to the plurality of images, a correction process for correcting the spread of light corresponding to a specified object point position, position of the optical system, and diaphragm opening, based on the optical transfer function of the optical system corresponding to the specified object point position, position of the optical system, and diaphragm opening.

6. The image capturing apparatus according to claim 2, wherein
the optical system holds the spread of light from the object point substantially constant regardless of the distance to the object point by modulating a wavefront of the light from the object point using a light modulating element.

7. The image capturing apparatus according to claim 6, wherein
the optical system holds the spread of light from the object point substantially constant regardless of the distance to the object point by using the light modulating element to apply, to the light from the object point, a three-dimensional phase distribution relating to a position relative to the optical axis.

8. An image capturing method comprising:
capturing, with an image capturing section, an image of a subject through an optical system that holds spread of light from an object point substantially constant regardless of distance to the object point and that has an optical transfer function that depends at least on distance to the object point;
controlling an imaging characteristic of the optical system to control the optical transfer function of the optical system, and causing the image capturing section to capture a plurality of images;
applying, to the plurality of images, a correction process for correcting the spread of light, based on a specified optical transfer function of the optical system; and
generating a composite image by superimposing, onto each other, a plurality of corrected images generated by applying the correction process to each of the plurality of images.

9. A non-transitory computer readable medium storing thereon a program for use by an image capturing apparatus, the program causing a computer to function as:
an image capturing section that captures an image of a subject through an optical system that holds spread of light from an object point substantially constant regardless of distance to the object point and that has an optical transfer function that depends at least on the distance to the object point;
a control section that controls an imaging characteristic of the optical system to control the optical transfer function of the optical system, and causes the image capturing section to capture a plurality of images;
an image processing section that applies, to the plurality of images, a correction process for correcting the spread of light, based on a specified optical transfer function of the optical system; and
an image generating section that generates a composite image by superimposing, onto each other, a plurality of corrected images generated by the image processing section applying the correction process to each of the plurality of images.

* * * * *